Figure 1:
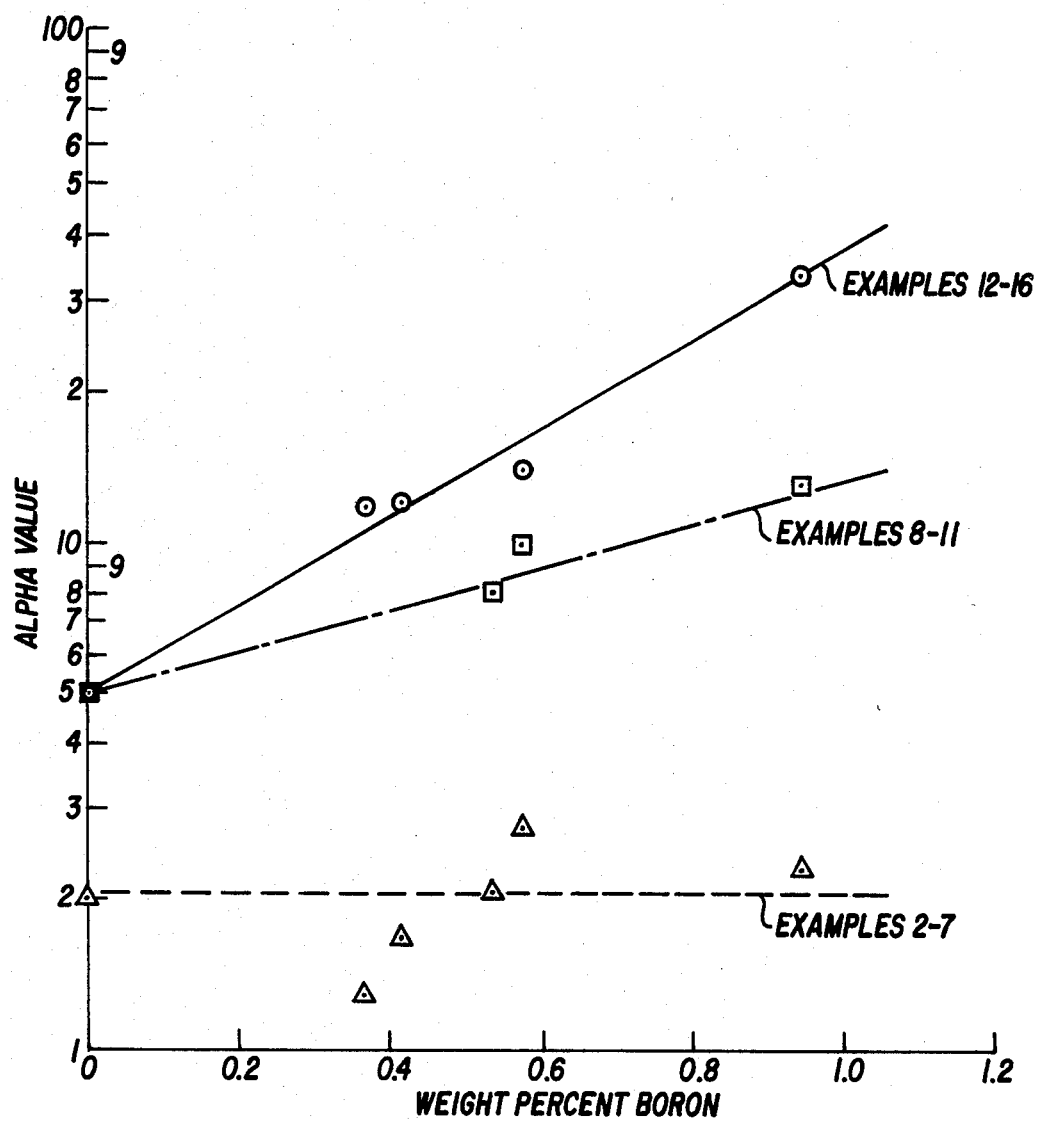

# United States Patent [19]

Chang et al.

[11] Patent Number: 4,524,140
[45] Date of Patent: Jun. 18, 1985

[54] HYDROTHERMAL ZEOLITE ACTIVATION

[75] Inventors: Clarence D. Chang, Princeton; Joseph N. Miale, Lawrenceville, both of N.J.

[73] Assignee: Mobil Oil Corporation, New York, N.Y.

[21] Appl. No.: 631,688

[22] Filed: Jul. 16, 1984

Related U.S. Application Data

[63] Continuation-in-part of Ser. No. 465,987, Feb. 14, 1983.

[51] Int. Cl.³ ............................................. B01J 29/28
[52] U.S. Cl. ....................................... 502/61; 502/71; 502/85
[58] Field of Search ........................ 502/61, 71, 77, 85

[56] References Cited

U.S. PATENT DOCUMENTS

| | | | |
|---|---|---|---|
| 4,175,057 | 11/1979 | Davies et al. | 502/61 |
| 4,269,813 | 5/1981 | Klotz | 502/202 X |
| 4,350,835 | 9/1982 | Chester et al. | 502/61 X |
| 4,377,504 | 3/1983 | Roberts et al. | 502/61 |

*Primary Examiner*—Carl F. Dees
*Attorney, Agent, or Firm*—Alexander J. McKillop; Michael G. Gilman; Dennis P. Santini

[57] ABSTRACT

Substitution of aluminum or gallium for boron or iron contained in the framework of a high silica content zeolite is effected by treating the zeolite in liquid water in the presence of a compound of aluminum or gallium.

8 Claims, 2 Drawing Figures

NH₃-TPD DIFFERENTIAL
THERMOGRAMS

HYDROTHERMAL ZEOLITE ACTIVATION

CROSS REFERENCE TO RELATED APPLICATION

This invention is a continuation-in-part of copending U.S. Patent Application Ser. No. 465,987 filed Feb. 14, 1983, the entire content of which is herein incorporated by reference as if fully set forth.

FIELD OF THE INVENTION

This invention relates to a method for increasing the catalytic activity of crystalline zeolites. In particular, a novel activation process is provided to enhance the alpha value of high-silica ZSM-5 type catalysts by hydrothermal treatment in contact with an inorganic activating agent.

BACKGROUND OF THE INVENTION

Zeolite catalysts have become widely used in the processing of petroleum and in the production of various petrochemicals. Reactions such as cracking, hydrocracking, catalytic dewaxing, alkylation, dealkylation, transalkylation, isomerization, polymerization, addition, disproportionation and other acid catalyzed reactions may be performed with the aid of these catalysts. Both natural and synthetic zeolites are known to be active for reactions of these kinds.

The common crystalline zeolite catalysts are the aluminosilicates such as Zeolites A, X, Y and mordenite. Structurally each such material can be described as a robust three dimensional framework of $SiO_4$ and $AlO_4$ tetrahedra that is crosslinked by the sharing of oxygen atoms whereby the ratio of total aluminum and silicon atoms to oxygen is 1:2. These structures (as well as others of catalytic usefulness) are porous, and permit access of reactant molecules to the interior of the crystal through windows formed of eight-membered rings (small pore) or of twelve-membered rings (large pore). The electrovalence of the aluminum that is tetrahedrally contained in the robust framework is balanced by the inclusion of cations in the channels (pores) of the crystal.

An "oxide" empirical formula that has been used to describe the above class of crystalline zeolites is

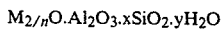
$$M_{2/n}O \cdot Al_2O_3 \cdot xSiO_2 \cdot yH_2O$$

wherein M is a cation with valence n, x has a value of from 2 to 10, and y has a value which varies the pore volume of the particular crystal under discussion. The above oxide formula may be rewritten as a general "structural" formula

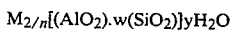
$$M_{2/n}[(AlO_2) \cdot w(SiO_2)]yH_2O$$

wherein M and y are defined as above, and wherein w has a value from 1 to 5. In this representation, the composition of the robust framework is contained within the square brackets, and the material (cations and water) contained in the channels is outside the brackets. One skilled in the art will recognize that x in the empirical oxide formula represents the mole ratio of silica to alumina in the robust framework of a crystalline zeolite, and shall be referred to herein simply by the expression in common usage, i.e. "the silica to alumina ratio". (See "Zeolite Molecular Sieves", Donald W. Breck, Chapter One, John Wiley and Sons, New York, N.Y. 1974, which is incorporated herein by reference as background material).

With few exceptions, such as with Zeolite A wherein x=2, there are fewer alumina tetrahedra than silica tetrahedra in the robust framework. Thus, aluminum represents the minor tetrahedrally coordinated constituent of the robust framework.

It is generally recognized that the composition of the robust framework may be varied within relatively narrow limits by changing the proportion of reactants, e.g., increasing the concentration of the silica relative to the alumina in the zeolite synthesis mixture. However, definite limits in the maximum obtainable silica to alumina ratio are observed. For example, synthetic faujasites having a silica to alumina ratio of about 5.2 to 5.6 can be obtained by changing said relative proportions. However, if the silica proportion is increased above the level which produces the 5.6 ratio, no commensurate increase in the silica to alumina ratio of the crystallized synthetic faujasite is observed. Thus, the silica to alumina ratio of about 5.6 must be considered an upper limit in a preparative process using conventional reagents. Corresponding upper limits in the silica to alumina ratio of mordenite and erionite via the synthetic pathway are also observed. It is sometimes desirable to obtain a particular zeolite, for any of several reasons, with a higher silica to alumina ratio than is available by direct synthesis. U.S. Pat. No. 4,273,753 to Chang and the references contained therein describe several methods for removing some of the aluminum from the framework thereby increasing the silica to alumina ratio of a crystal.

For the above zeolite compositions, wherein x has a value of 2 to 10, it is known that the ion exchange capacity measured in conventional fashion is directly proportional to the amount of the minor constituent in the robust framework, provided that the exchanging cations are not so large as to be excluded by the pores. If the zeolite is exchanged with ammonium ions and calcined to convert it to the hydrogen form, it aquires a large catalytic activity measured by the alpha activity test for cracking n-hexane, which test is more fully described below. And, the ammonium form of the zeolite desorbs ammonia at elevated temperature in a characteristic fashion.

Synthetic zeolites wherein x is greater than 12, which have little or substantially no aluminum content, are known. Such zeolites have many important properties and characteristics and a high degree of structural stability such that they have become candidates for use in various processes including catalytic processes. Materials of this type are known in the art and include high silica content aluminosilicates, such as ZSM-5 (U.S. Pat. No. 3,702,886), ZSM-11 (U.S. Pat. No. 3,709,979), and ZSM-12 (U.S. Pat. No. 3,832,449) to mention a few. Unlike the zeolites described above wherein x=2 to 5, the silica to alumina ratio for at least some of the high silica content zeolites is unbounded. ZSM-5 is one such example wherein the silica to alumina ratio is at least 12. U.S. Pat. No. 3,941,871 discloses a crystalline metal organosilicate essentially free of aluminum and exhibiting an X-ray of diffraction pattern characteristic of ZSM-5 type aluminosilicates. U.S. Pat. Nos. 4,061,724, 4,073,865 and 4,104,294 describe microporous crystalline silicas or organosilicates wherein the alumina content present is at impurity levels. Some of the high silica content zeolites contain boron or iron which is not reversibly removed by simple ion exchange, i.e. the zeolites contain tenaciously bound boron or iron.

Because of the extremely low alumina content of certain high silica content zeolites, their catalytic activity is not as great as materials with a higher alumina content. Therefore, when these materials are contacted with an acidic solution and thereafter are processed in a conventional manner, they are not as catalytically active as their higher alumina content counterparts.

It is an object of the present invention to provide a method for increasing the catalytic activity of a high silica content zeolite that contains tenaciously bound boron or iron. It is a further object of this invention to provide a method for substituting aluminum or gallium for boron or iron contained in the robust framework of a high silica content zeolite. It is a further object of this invention to provide novel catalytic compositions prepared by the method of this invention.

SUMMARY OF THE INVENTION

A unique crystalline zeolite material having enhanced cracking activity (alpha-value) has been discovered by the technique of hydrothermally treating, in the presence of a compound of aluminum or gallium, a high silica content zeolite that contains tenaciously held boron or iron to effect substitution by aluminum or gallium for said boron or iron.

The technique is particularly advantageous for treating hydrogen form or ammonium form zeolites that have a silica to alumina ratio greater than 100 to 1, and that have a boron or iron content of at least 0.1 wt%.

The novel process of this invention permits the preparation of high silica content zeolites which have all the desirable properties inherently possessed by such high silica materials, and yet have an acid cracking activity (alpha-value) which heretofore has only been possible to achieve with materials having a higher aluminum content in the robust framework.

DESCRIPTION OF PREFERRED EMBODIMENTS p As has heretofore been stated, the noval process of this invention is concerned with changing the composition of the robust framework of a high silica content zeolite that contains at least 0.1 wt% of tenaciously held boron or iron. The expression "high silica content" is intended herein to define a crystalline zeolite structure which has a silica to alumina ratio greater than 20 and more preferably greater than 100 up to and including those highly siliceous materials where the silica to alumina ratio if very large, e.g. greater than 1000. This latter group of highly siliceous materials is exemplified by U.S. Pat. Nos. 3,941,871, 4,061,724, 4,073,865 and 4,104,294 wherein the materials are prepared from forming solutions to which no deliberate addition of aluminum was made. However, trace quantities of aluminum are usually present due to the impurity of the reactant solutions.

The preferred high silica content zeolite that is to be activated by the process of this invention has the crystal structure of a zeolite of the ZSM-5 type as evidenced by X-ray diffraction. This type of zeolite freely sorbs normal hexane, and has a pore size intermediate between the small pore zeolites such as Linde A and the large pore zeolites such as Linde X, the pore windows in the crystals being formed of 8-membered rings. The crystal framework densities of this type zeolite in the dry hydrogen form is not less than 1.6 grams per cubic centimeter. It is also known that ZSM-5 type zeolites exhibit constrained access to singly methyl-branched paraffins, and that this constrained access can be measured by cracking a mixture of n-hexane and 3-methylpentane and deriving therefrom a "Constraint Index". ZSM-5 type zeolites exhibit a Constraint Index of 1 to 12 provided they have sufficient catalytic activity or are activated by the method of this invention to impart such activity. The boron containing and iron containing ZSM-5 type zeolites useful for the process of this invention have a crystal structure exemplified by ZSM-5, ZSM-11, ZSM-12, ZSM-23, ZSM-35, ZSM-38 and ZSM-48. Columns 4, line 30 to column 11, line 26 inclusive of U.S. Pat. No. 4,385,195 issued May 24, 1983, and the U.S. patents referred to therein, are incorporated herein by reference for a detailed description including the X-ray diffraction patterns of the foregoing ZSM-5 type zeolites; a detailed description of crystal density and method for measuring this property; a a detailed description of Constraint Index and method for measuring this property; and, for matter related to the foregoing.

Methods for preparing high silica content zeolites that contain tenaciously held boron or iron are known in the art and are not considered part of the present invention. The amount of boron contained therein, for example, may be made to vary by incorporating different amounts of borate ion in a ZSM-5 forming solution. One such recipe is shown, for example, by Examples 6 of European Pat. No. 68,796. Prior to activation by treatment with aluminum or gallium by the method of this invention, the chosen zeolite is calcined and converted by ion exchange to the ammonium or to the hydrogen form by calcination, by methods known to those skilled in the art. Although either the ammonium or the hydrogen form may be activated, the hydrogen form is preferred since it is somewhat more effective. For purposes of the present invention, the zeolite must contain at least about 0.1 wt % boron or iron, although it may contain from 0.1 wt% to about 2.5 wt%. In general, under comparable conditions, the higher the initial content of tenaciously held boron or iron, the greater the degree of substitution and of enhancement of catalytic activity.

The ammonium or hydrogen form of the high silica content zeolite is treated in a liquid water medium with a source of aluminum or gallium to induce substitution and activation. The treatment is conducted at an elevated temperature of about 50° C. to 375° C. under ambient or autogenous pressure so as to maintain the water in liquid phase, and for a time effective to induce the desired extent of substitution. Depending on the nature of the aluminum or gallium source, and depending on the temperature, effective substitution is achieved in from about 0.25 to 150 hours.

Although aluminum or gallium salts such as chlorides, sulfates and nitrates may be used, it is preferred to use the solid chalcogenides of these metals. Particularly useful are the various sesquioxides, such as alpha alumina monohydrate, and gel precursors of the sesquioxides. The solid oxide may be in the form of distinct particles, or it may be composited with the zeolite as binder. For purposes of the present invention, the preferred treating material is aluminum in the form of a solid oxide and a particularly preferred embodiment is the use of alpha alumina monohydrate binder, composited with the zeolite to be treated. In general, a large excess of the treating material is used to effect the substitution.

In general, after completion of the substition treatment, it is desirable to ion exchange the zeolite with an ammonium salt and to convert this to the hydrogen form by calcination prior to use of the product as catalyst.

While not wishing to be bound by theory, it is believed that the effectiveness of this invention is a result of the substitution of aluminum or gallium for boron or iron contained in the robust framework of the zeolite. Whereas either framework boron, for example, or framework aluminum, would be expected (if in the trivalent state) to be associated with interstitial cations such as hydrogen ions, those associated with boron have a very low or an undetectable catalytic activity for cracking n-hexane under conditions at which hydrogen ions associated with aluminum have a very large activity. As is known in the art, the acid catalytic activity of a zeolite may be measured by its "alpha value", which is the ratio of the rate constant of a test sample for cracking normal hexane to the rate constant of a standard reference catalyst. Thus, an alpha value=1 means that the test sample and the standard reference have about the same activity. The alpha test is described in U.S. Pat. No. 3,354,078 and in The Journal of Catalysis, Vol. IV, pp. 527-529 (August 1965).

As will be seen in the examples which follow, although the method of this invention results in some increase in catalytic activity even when no boron is present, the presence of increasing amounts of tenaciously bound boron results in progressively larger increases of activity.

EXAMPLES

The following examples are for the purpose of illustrating this invention, and are not intended to limit the scope thereof, which scope is defined by this entire specification including the claims appended thereto. All parts and proportions are by weight unless explicitly stated to be otherwise. All alpha values reported in these examples refer to measurements made with the sample in the hydrogen form.

EXAMPLE 1

A high silica content ZSM-5 that contained tenaciously held boron was prepared by the method described in U.S. Pat. No. 4,269,813. A portion of the product was evaluated for cracking activity and was found to have an alpha value of 7.

Another portion of the product was converted to the hydrogen form and mixed with an equal part of gamma alumina beads. The mixture was hydrothermally treated in liquid water at 205° C. for 18 hours. The product zeolite was separated from the beads, ammonium exchanged and calcined. Its alpha value was found to be 12.

EXAMPLES 2-7

Six different ZSM-5 preparations with a low content of alumina were made. They were prepared to contain from 0 wt% up to 0.95 wt% boron. Each of the products was found to have the X-ray diffration pattern of ZSM-5.

A portion of each of the products was analyzed for aluminum and boron content. The results are summarized in Table 1. The alpha values of these materials before hydorthermal treatment are shown in FIG 1.

TABLE 1

| Example | Al, ppm | B, wt % |
| --- | --- | --- |
| 2 | 677 | 0.00 |

TABLE 1-continued

| Example | Al, ppm | B, wt % |
| --- | --- | --- |
| 3 | 640 | 0.37 |
| 4 | 604 | 0.42 |
| 5 | 527 | 0.54 |
| 6 | 670 | 0.58 |
| 7 | 600 | 0.95 |

EXAMPLES 8-11

A portion of the products of Examples 2, 5, 6 and 7 were calcined in air and base exchanged with ammonium acetate solution to convert to the ammonium form. Each sample was then placed in a 30 ml screw-cap Oak Ridge type teflon centrifuge tube, and an equal weight of 1.5 mm gamma alumina beads were added. The samples were covered with about 20 ml of water and placed in a 500 ml Autoclave Engineers Zipperclave with stirrer removed, and heated to 155° C. for 65 hours under autogeneous pressure. The zeolite crystals were separated from the alumina beads, exchanged with 1 N NH$_4$NO$_3$ at 25° C. for 18 hours, washed with distilled water and calcined at 538° C. for 30 minutes. The zeolites were then tested for n-hexane cracking activity using the alpha test. Results are summarized in Figure 1, which plots alpha vs. wt% B (boron) in the parent material.

EXAMPLES 12-16

A portion of each of the products of Examples 2, 3, 4, 6, and 7 were taken to provide materials for Examples 12-16, respectively, then calcined in air, converted to the ammonium form and calcined to convert the ammonium form to the hydrogen form.

The hydrogen form samples were treated in the same manner as described for Examples 8-11, and the alpha values determined. The results are shown in FIG. 1, in increasing order of boron content of the parent materials.

EXAMPLE 17

Figure 2:
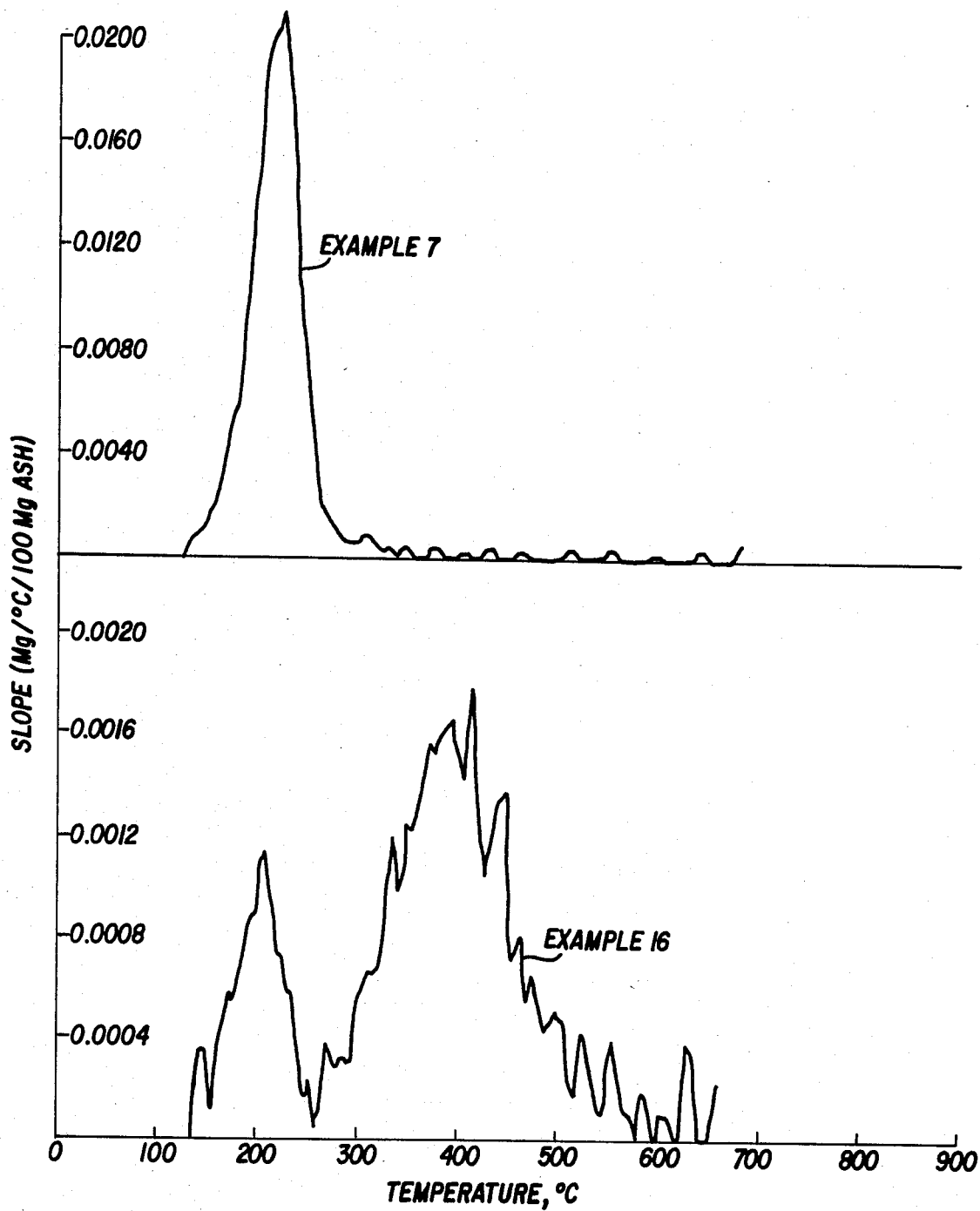

Portions of the products of Examples 7 and 16 were converted to the ammonium form and subjected to temperature-programmed desorption. The results are shown in FIG. 2.

As shown, in the drawing, the untreated sample that contained boron exhibits only low-temperature desorption, ascribable to framework boron, while the treated sample shows a large high-temperature peak, ascribable to framework aluminum, and a small low-temperature peak ascribable to residual framework boron.

EXAMPLE 18

A portion of the product of Example 7, was treated as in Example 16 except that a saturated aqueous gallium chloride solution was used instead of the alumina beads. The product, in the hydrogen form, was found to have an alpha value above 330.

What is claimed is:

1. A method for substituting aluminum or gallium for boron or iron contained in the robust framework of a high silica content crystalline zeolite, which method comprises:

hydrothermally treating said zeolite in the presence of a compound of said alumina or gallium, said hydrothermal treatment being under conditions effective to induce said substitution.

2. The method described in claim 1 wherein said compound of aluminum or gallium is water soluble.

3. The method described in claim 1 wherein said compound of aluminum or gallium is an oxide.

4. The method described in claim 3 wherein said aluminum is an oxide binder composited with said zeolite.

5. A method for substituting aluminum for boron or iron contained in the robust framework of a crystalline zeolite of the ZSM-5 type, which method comprises:

hydrothermally treating the ammonium form or the hydrogen form of said zeolite in the presence of a reactive aluminum oxide and under conditions effective to induce said substitution.

6. The method described in claim 5 wherein said crystalline zeolite is ZSM-5, ZSM-11, ZSM-12, ZSM-23, ZSM-35, ZSM-38 or ZSM-48.

7. A method for increasing the catalytic acid activity of a high silica content crystalline zeolite that contains tenaciously held boron or iron which method comprises:

contacting said zeolite with a compound of aluminum or gallium under hydrothermal conditions, which conditions include a temperature of 50° C. to 375° C. for from 0.25 hour to 350 hours whereby enhancing said catalytic acid activity as determined by the alpha test.

8. The product formed by the method of claim 1 or 2 or 3 or 4 or 5 or 6 or 7.

* * * * *